Patented Jan. 1, 1952

2,580,832

UNITED STATES PATENT OFFICE 2,580,832

PREPARATION OF NITRILOTRISPROPION-
AMIDE

Edward W. Pietrusza, Morristown, N. J., assignor to Allied Chemical & Dye Corporation, New York, N. Y., a corporation of New York No Drawing. Application October 6, 1949,
Serial No. 119,990

8 Claims. (Cl. 260—561)

This invention relates to manufacture of 3,3,3-nitrilotrispropanamide, a useful chemical intermediate, having the formula $N(CH_2CH_2CONH_2)_3$.

In the past, ammonia has been brought into reaction at about room temperature with acrylic acid esters, alone and in anhydrous methanol reaction medium. Oily mixtures of products, such as beta-alanine esters and the corresponding secondary amino diesters and tertiary amino triesters, and the corresponding amides are thereby formed. In accordance with this prior art, no one product is obtained in yields above about 50-55% of theory; and with reaction times less than several weeks, the yields of any individual product in accordance with the above art are not even 50% of theory. The resulting oily product mixtures are difficult to separate, requiring fractional distillation, fractional crystallization and the like.

Reaction of acrylic acid esters and aqueous ammonia at elevated temperatures, such as 140-150° C. and above, under autogenous pressures, has been proposed as a method for making beta-alanine.

I have now found how to conduct reaction between ammonia and acrylic acid esters in solution so as to obtain good to excellent yields (75%-90% of theory or better) of 3,3,3-nitrilotrispropanamide, using reasonable reaction times of not more than a few hours. Moreover the product obtained in accordance with my process crystallizes from the liquid reaction mixture and may therefore be separated for further use by simple filtration.

In accordance with my invention, reaction is effected between an acrylic ester and ammonia by contacting said reactants at temperatures between about minus 20° C. and about 50° C., in a liquid reaction medium containing a hydroxylated solvent having a greater dielectric constant than methanol, said hydroxylated solvent providing at least about 1.5 mols of hydroxyl group per mol of acrylate introduced into the reaction zone, but preferably not more than about 12 mols of hydroxyl group per mol of acrylate introduced into the reaction zone.

The liquid reaction mixture as a whole is a solvent for the intermediate products of reaction such as the amino esters above referred to, and is a non-solvent for the desired trisamide product. The liquid reaction mixture as a whole will contain chiefly ammonia, intermediate amino esters and amides, alcohol derived from ammonolysis of the starting ester, hydroxylated solvent ingredient, and any alcohol or inert solvent which may have been added. At the start of reaction an acrylate phase, separate from the phase containing hydroxylated solvent, is sometimes present; but as reaction progresses this acrylate phase is eventually solubilized via conversion of acrylate to intermediates.

Suitable operating conditions are illustrated in connection with the examples which follow. The examples are, however, illustrative only and are not to be interpreted as limiting the scope of the invention.

*Example 1.*—(a) Over the course of two hours, 86 parts by weight of methyl acrylate were added to 304 parts by weight of concentrated aqueous ammonium hydroxide (about 0.9 specific gravity) with stirring and cooling in an ice bath. The mol ration of $NH_3$:methyl acrylate was 5:1. This step is somewhat exothermic. A clear colorless solution resulted.

This solution was maintained at temperatures between minus 10 and minus 20° C. for five hours. A precipitate formed which was filtered off, washed with methanol, and dried at 60° C.; it amounted to 39 parts by weight and melted at 176-9° C. Further quantities of the precipitate were obtained after overnight standing and by concentrating the wash liquids and mother liquors and cooling. The total yield of crude solid thus obtained was 58 parts, i. e. about 76% of theory for 3,3,3-nitrilotrispropanamide.

After recrystallization three times from a 75% methanol solution, the melting point of the solid product was 183-4° C. Analysis of the purified solid for carbon, hydrogen and nitrogen corresponded to the theoretical for 3,3,3-nitrilotrispropanamide. The compound was converted by acid hydrolysis to a solid compound identified as the tris-acid corresponding to 3,3,3-nitrilotrispropanamide.

(b) In like experiments at 0° C. in which, after separation of the first crop of crystals in yields of about 60% of theory, the original quantities of methyl acrylate and anhydrous ammonia were added at about 0° C. to the mother liquors, yields of tris-amide isolated by filtration from the reaction medium reached 80-90% of theory in less than 24 hours. This recycling of mother liquors was performed four times, after which accumulated methanol was evaporated and the remaining aqueous mother liquors were again recycled with results as before.

(c) When process (b) above was carried out at about room temperatures instead of at 0° C. the results were practically the same as those obtained around 0° C.

(d) When concentrated (28 weight percent) aqueous ammonia in mol ratios of 2:1, 3:1, and 10:1 with methyl acrylate was substituted for the aqueous ammonia used in process (b) above, yields of tris-amide crystallized during the reaction were from 50–80% of theory. The lower ratios gave the lower percent of theory yields but gave larger yields in terms of grams of product per hour per unit volume of reaction mixture, hence were fully satisfactory.

*Example 2.*—Ethylene glycol (300.0 g.) was saturated with ammonia at 0° C. and 77.4 g. (0.9 mol) of methyl acrylate was added with stirring. (Methyl acrylate is soluble in glycol-$NH_3$.) The homogeneous solution was seeded with tris-amide crystals and allowed to stand at room temperature (20–30° C.). Precipitation usually occurred in less than 24 hours upon scratching the sides of the container, but to insure complete reaction the mixture was allowed to stand at room temperature for several days. The mixture was then cooled in ice and filtered. The crude tris-amide obtained was washed thoroughly with cold methanol and dried to constant weight at 60° C.

The glycol mother liquors were re-cycled for six additional runs after saturation with ammonia. The $NH_3$:methyl acrylate mol ratios were about 3:1–5:1.

| Run | Time Pptn. Appreciable | Total Time allowed to stand at R. T. | Product (grams) | M. P. °C. | Conversion to trisamide (mole per cent of theory) [2] |
|---|---|---|---|---|---|
| | Hrs. | Hrs. | | | |
| 1 | 24 | 45 | 38.5 | 171–8 | 56.0 |
| 2 | 17 | 20 | 48.0 | 174–7 | 69.5 |
| 3 | 20 | 69 | 72.0 | 172–9 | 104.0 |
| 4 | 15 | 69 | 65.0 | 173–9 | 94.3 |
| 5 [1] | 15 | 96 | 62.0 | 172–9 | 90.0 |
| 6 | 24 | 96 | 83.0 | 173–9 | 120.0 |
| 7 | 24 | 96 | 65.0 | 170–9 | 94.3 |
| | | | | | [3] 89.7 |

[1] After this run (5) the methanol resulting from ammonolysis of the methyl acrylate was removed from the glycol mother liquors by heating under reduced pressure. Methyl acrylate was added to the glycol mother liquors and the solution was allowed to stand at room temperature overnight. The viscous liquid was then saturated with $NH_3$ in the cold.
[2] These percentage figures represent insoluble matter isolated by filtration and do not include amounts of amide present in solution. The per cent figures are based on the amount of methyl acrylate added and on the assumption the insoluble matter is pure tris-amide.
[3] Average per cent.

Glycerol, when substituted for ethylene glycol as hydroxylated solvent for conversion of methyl acrylate to 3,3,3-nitrilotrispropanamide gave like results to those obtained using glycol.

Other acrylates which have been converted to 3,3,3-nitrilotrispropanamide in presence of ethylene glycol include ethyl, propyl, and butyl acrylate.

A reaction system which is preferred because of the relatively rapid reaction rate obtained therein contains methyl acrylate as the starting ester reactant and water as the hydroxylated solvent. The mol ratio of water to methyl acrylate is at least 1.5:1, advantageously at least about 4:1 to assure high space-time yields, and is preferably not more than about 12:1. Particularly good results in terms of space-time yields are obtained with mol ratios between about 5:1 and about 10:1.

Best rates of reaction are obtained by periodically or continuously withdrawing reaction mixture from the reaction zone, separating tris-amide product, and recycling the mother liquors containing intermediates to serve as reaction medium and as source of additional tris-amide obtained from the intermediates under the reaction conditions in the reaction zone.

Alcohol from ammonolysis of the starting ester builds up in the reaction medium in such operations unless removed and tends to dilute the active ingredients. Desirably any alcohol in the reaction medium is kept below about a weight equal to the weight of hydroxylated solvent in the reaction medium.

Preferred temperatures, which are conveniently maintained and which give good yields of products, are between about 0° C. and about room temperatures (25–30° C.). Appreciable amounts of tris-amide are obtained at temperatures of 50° C.; but at temperatures as high as 100° C. little or no tris-amide is obtained, at least when water is the hydroxylated solvent.

Stirring of the reaction mixture is advantageous to increase the rate of reaction and to promote formation of an easily filterable non-caking precipitate.

Certain materials when added to the reaction mixture show a catalytic effect on reaction rates. Among those which have been tested, ammonium acetate appears of particular interest. For example, an ethylene glycol solution saturated with ammonia and ammonium acetate, to which methyl acrylate was added, precipitated tris-amide in approximately 6 hours as against 15 hours in the absence of ammonium acetate. Use of such catalyst is not, however, essential to obtain good results in accordance with my process.

The quantity of ammonia introduced into the reaction mixture in my process should be in excess of theory, i. e. it should be more than 1.33 mols per mol of acrylate introduced into the reaction mixture. Suitably about 2–5 mols of ammonia per mol of acrylate reactant are employed but larger amounts such as 10 mols or more produce similar yields in percent of theory of tris-amide. If it is desired to employ large ammonia mol ratios, ammonia is suitably maintained under superatmospheric pressure over the reaction mixture.

The time of reaction need be no more than a few hours, but longer times may somewhat increase the yield per pass of product.

Construction materials suitable for apparatus employed in my process are materials resistant to the action of concentrated aqueous ammonia such as stainless steel, etc.

I claim:
1. A process for synthesis of 3,3,3-nitrilotrispropanamide by solution phase reaction of ammonia, present in excess, with an acrylic ester, in which process a homogeneous liquid phase reaction mixture is formed by contacting, am- monia and acrylic ester, at least partially soluble in the reaction mixture, at temperatures between about minus 20° C. and about 50° C. in presence of a hydroxylated solvent which solvent has a greater dielectric constant than methanol, said hydroxylated solvent providing at least about 1.5 mols of hydroxyl group per mol of acrylate introduced into the reaction zone; free ammonia is maintained present in said reaction mixture until trisamide precipitates; and thereafter precipitated trisamide is recovered from the reaction mixture.

2. A process as defined in claim 1 wherein the acrylic ester employed is an ester corresponding to a monohydric saturated alcohol having 1-4 carbon atoms in the molecule.

3. A process as defined in claim 2 wherein the hydroxylated solvent is ethylene glycol.

4. A process as defined in claim 2 wherein the hydroxylated solvent is glycerol.

5. A process as defined in claim 1 wherein the acrylic ester is methyl acrylate and the hydroxylated solvent is water.

6. A process as defined in claim 5 wherein the mol ratio of water:acrylate is between about 4:1 and about 12:1.

7. A process as defined in claim 5 wherein the mol ratio of ammonia:acrylate is between about 2:1 and about 5:1 and the mol ratio of water:acrylate is between about 5:1 and about 10:1.

8. A process as defined in claim 7 wherein mother liquors from previous operation of said process are recycled to the reaction zone after removal of methanol therefrom to maintain the methanol content of the reaction medium below a 1:1 weight ratio with the water therein.

EDWARD W. PIETRUSZA.

REFERENCES CITED

The following references are of record in the file of this patent:

UNITED STATES PATENTS

| Number | Name | Date |
|---|---|---|
| 2,120,933 | Dittmar | June 14, 1938 |

OTHER REFERENCES

Morsch, "Monatshefte fur Chemie," vol. 63 (1933), pages 221, 223 to 228.